F. HUDSON.
TROLLEY WHEEL TURNING MACHINE.
APPLICATION FILED OCT. 20, 1908.

960,932.

Patented June 7, 1910.
6 SHEETS—SHEET 2.

WITNESSES:
H. L. Sprague
Harry W. Bourn

INVENTOR,
Francis Hudson
BY
Chopin Red
ATTORNEYS.

F. HUDSON.
TROLLEY WHEEL TURNING MACHINE.
APPLICATION FILED OCT. 20, 1908.

960,932.

Patented June 7, 1910.
6 SHEETS—SHEET 3.

WITNESSES:
H. L. Sprague
Harry W. Bourn

INVENTOR
Francis Hudson
BY
Chapin &co.
ATTORNEYS

F. HUDSON.
TROLLEY WHEEL TURNING MACHINE.
APPLICATION FILED OCT. 20, 1908.

960,932.

Patented June 7, 1910.
6 SHEETS—SHEET 5.

WITNESSES:
H. L. Sprague
Harry W. Bourn

INVENTOR,
Francis Hudson
BY
Chapin Geo.
ATTORNEYS.

UNITED STATES PATENT OFFICE.

FRANCIS HUDSON, OF HOLYOKE, MASSACHUSETTS.

TROLLEY-WHEEL-TURNING MACHINE.

960,932.

Specification of Letters Patent. Patented June 7, 1910.

Application filed October 20, 1908. Serial No. 458,737.

*To all whom it may concern:*

Be it known that I, FRANCIS HUDSON, a citizen of the United States of America, residing at Holyoke, Fairview, in the county of Hampden and State of Massachusetts, have invented new and useful Improvements in Trolley-Wheel-Turning Machines, of which the following is a specification.

This invention relates to machines for turning anti-friction wheels, as commonly used on sliding doors or trolley-tracks, or for other analogous uses, the particular object of the machine being to simultaneously turn and finish the outer surface or periphery of several wheels at one time, whether the wheels are made of iron, brass, fiber, hard rubber or any other suitable material, the herein described machine being so designed that it may turn and finish at least four at once.

Broadly stated, the invention comprises a rotatable turret member that is suitably supported so as to revolve in a horizontal plane on a circular base, the turret member being provided with spindles or wheel-supporting arbors which are simultaneously rotated during the turning and finishing operation. Located above the rotatable turret member are a series of cutters or chasers that are caused, through suitable mechanism, to simultaneously advance during the turning and finishing operation of the several wheels, after which operation the cutters will be simultaneously withdrawn from the finished wheel, at the same time releasing the locking mechanism for the rotatable turret, and the turret is advanced or rotated forwardly through an arc of 180° thus bringing into position a new set of wheels to be turned and finished, the new set of wheels having in the mean time been mounted on the spindles that are idle. It should be understood that the spindles which carry the wheels that are not being finished do not rotate.

Some of the objects of this invention are,—(1) to provide means for intermittently feeding the cutters toward and away from the wheels that are being turned; (2) to provide means for automatically throwing the spindle or arbors which support the wheels during the turning operation into and out of action during the rotation of the turret; (3) to provide means for raising and lowering the platform which carries the chasers or cutters so that wheels of greater width of tread may be turned; (4) to provide a flexible shaft construction whereby all of the cutters or chasers may be simultaneously operated; (5) to provide means for varying the position, or adjusting the cutters, so that wheels of greater or less diameter may be turned or finished.

Other objects and the nature of the invention will be fully described in the body of the specification and particularly pointed out in the claims.

In the drawings forming part of this application.

Referring to the drawings,—$a$ designates the circular base portion of the machine in which is diametrically located the main drive-shaft $b$ through which power is transmitted from the belt $c$ and step cone-pulley $d$ that is secured thereto, the bearings for the drive-shaft $b$ being indicated at $e$ and $f$.

The rotatable turret is indicated at $g$, the lower portion of which is bolted to a web or spider construction $h$.

The base portion $a$ and the web portion $h$ are provided with ball-retaining races $i$ for supporting the anti-friction balls $j$ therein, whereby the turret $g$ can be moved on the base $a$ with very little frictional resistance.

Bolted to the web portion $h$ is a beveled gear $k$, and meshing with the latter is another gear $m$ (shown in Figs. 3 and 4) which serves to rotate the turret $g$, the power being obtained for this purpose through the jack-shaft $n$ by means of the sprocket-chain $o$ and sprocket-wheels $p$ and $q$ as will be fully described later.

Figure 10:
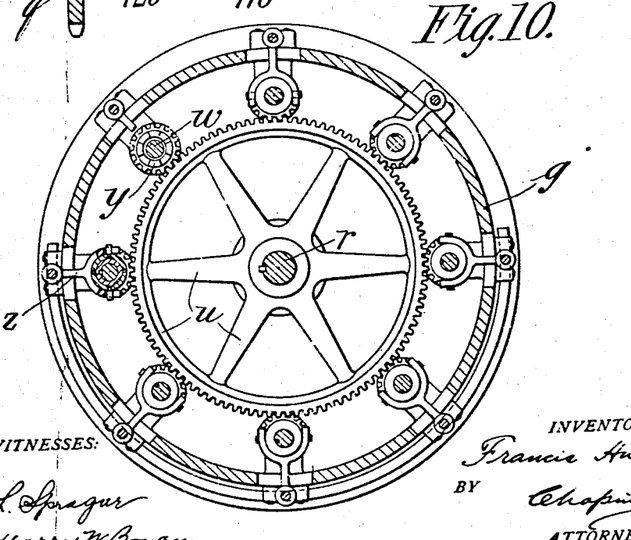
Fig. 10 is a horizontal sectional view on the line 10—10, of Fig. 3, looking in the direction of the arrow, clearly illustrating the master gear that continuously rotates the wheel-supporting arbors or shafts, and also the clutch mechanism for connecting and disconnecting the arbors from the master-wheel.

Extending vertically through the center of the rotatable turret $g$ is a shaft $r$ that is rotated from the main shaft $b$ by means of the beveled gears $s$ and $t$. Secured to the shaft $r$ is a large spur gear-wheel $u$ that meshes with a series of pinions $v$ that are equally spaced from each other around the inner surface of the turret $g$ (see Figs. 3, 4, and 10), these pinions being secured to the wheel-supporting spindles $w$. The upper edge or hub portion of the pinions $v$ is provided with a clutch or tooth construction $x$ that is adapted to be engaged by corresponding teeth on a clutch collar $y$ that is splined to the spindles $w$, while the pinions $v$ are loose on the spindles $w$. The collar $y$ is adapted to be raised and lowered on the spindles $w$ by means of an arm $z$ that is secured to a vertically arranged pin $2$ which is normally pressed downward by means of a coiled spring $3$ that is located between the arm $z$ and a lug $4$. The spindles $w$ are rotatably mounted in lugs or bosses $5$ that are arranged equidistantly from each other on the vertical interior surface of the turret $g$. The upper end of the spindles $w$ passes through lugs or bosses $6$ and is bored out to receive a wheel-supporting element $7$ similar to a lathe center for supporting the wheels $8$ that are to be turned.

$9$ designates a spanner nut for removing the wheel-supporting element $7$ from the spindles $w$ when it is desired to turn wheels of different diameters or widths, as desired.

$8^1$ designates a collar integral with the wheel-supporting element $7$ and provided with pins $8^2$ for causing the wheels $8$ to turn with the wheel-supporting element $7$.

It will be noticed that the master spur gear wheel $u$ is in constant rotation being driven from the main shaft $b$ and the shaft $r$; and the pinions $v$ are also constantly rotating, but the wheels $8$ to be turned are only rotated when the collar $y$ is clutched or locked to the tooth construction $x$ of the pinions $v$. This locking operation will occur when the pin $2$ is out of engagement with the semi-circular track $10$ (clearly shown in Fig. 2 and in plan view in Fig. 1) which is provided with an inclined end portion $11$ for the lower ends of the pins $2$ to pass up when the turret is rotated. It will therefore be seen that one half of the spindles $w$ are at rest and one half are in motion at all times.

Figure 3:
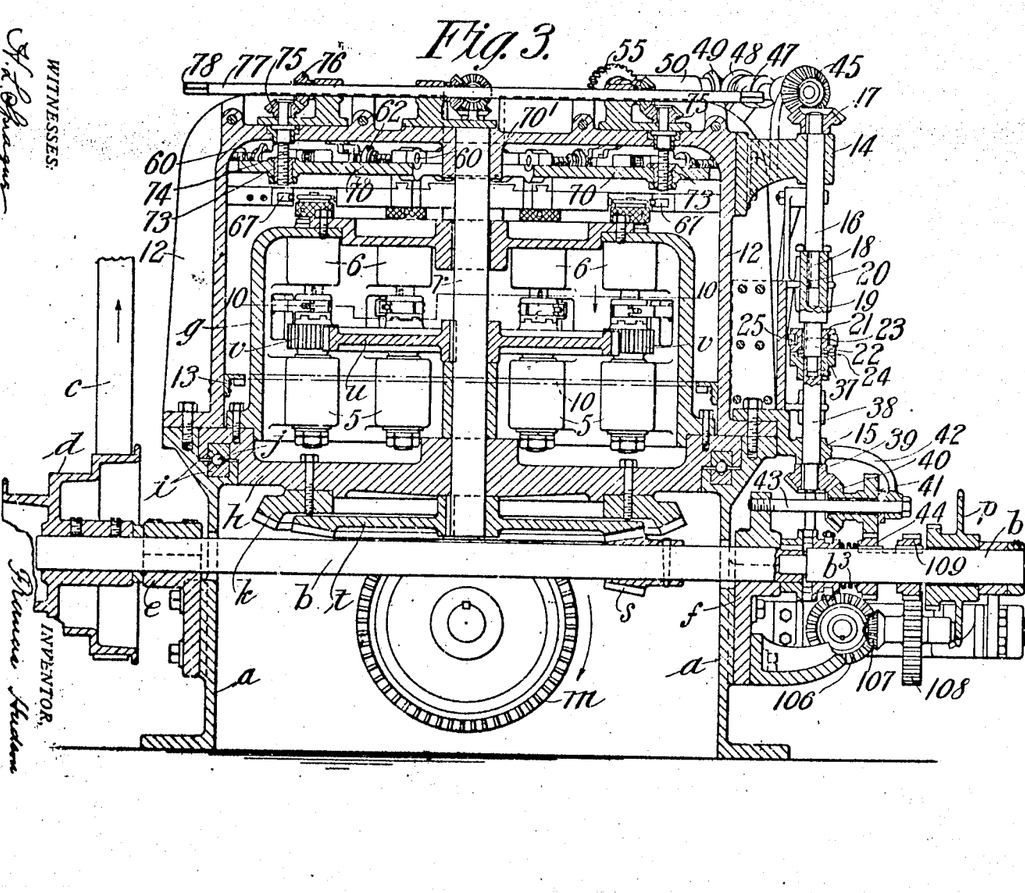
Fig. 3 is a vertical sectional view on the line 3—3 of Fig. 1 illustrating the location of the main drive-shaft and the means for rotating the wheel-carrying spindles and the clutch means for throwing the spindles into and out of operation and the means for rotating the turret; also clearly showing at the right-hand end of the figure a set of mechanisms for imparting motion from the main shaft to the cutter-operating devices and the gearing for raising and lowering the platform which carries the cutters.

The track is secured to the upright braces $12$ by means of the brackets $13$, as clearly shown in Fig. 3.

Figure 2:
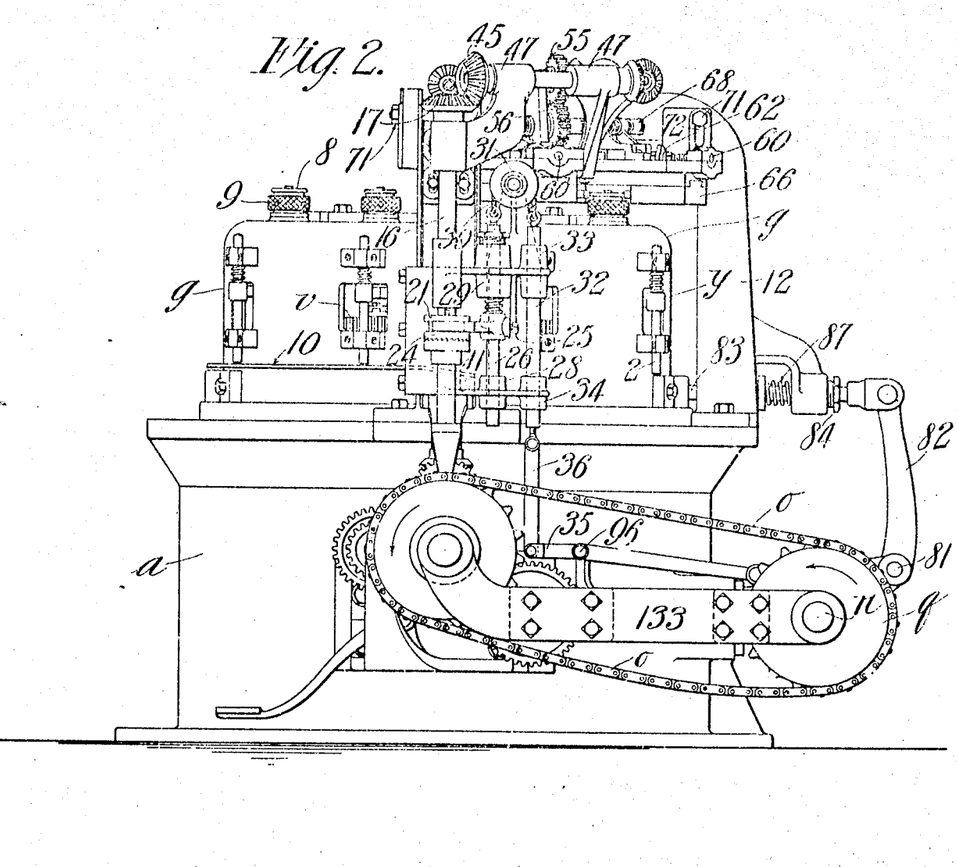
Fig. 2 is a side elevation of the machine looking at Fig. 1 from the right-hand side thereof, clearly showing the track arrangement for automatically throwing the wheel-carrying shafts or arbors out of operation, and the sprocket-chain construction for transmitting motion from the main drive-shaft to the jack-shaft which operates the turret-locking mechanism, and also the mechanism which imparts an intermittent feed to the cutters, if desired.

Referring now to the mechanism for operating the cutters or chasers which perform the turning operation on the wheels $8$: mounted in brackets $14$ and $15$ that are secured to one of the braces $12$ is a vertical shaft $16$, the upper end of which is provided with a beveled gear $17$ and the lower portion is reduced in diameter, as shown at $18$, which portion is splined into a member or intermediate shaft $19$, as shown at $20$. The shaft $19$ has mounted thereon a clutch collar $21$ which is splined to the part $22$, as shown at $23$. This collar is provided on its lower edge with teeth $24$, as shown in Figs. 2 and 3.

$25$ designates an arm that is attached to a vertical rod $26$ which is mounted in bearings $28$ and $29$. To the upper end of the rod is attached a flexible element $30$, (as a wire rope,) that passes over a pulley $31$, the other end being attached to a second vertical rod $32$ mounted in the bearings $33$ and $34$, the lower end of which is connected to the rocking lever $35$ by means of a link $36$ whereby, when the rocking lever is operated, the teeth $24$ of the collar $21$ will be intermittently brought into and out of engagement with the teeth on the upper edge of a collar 37 which is secured to a shaft 38 when it is desired to drive the shaft 16 intermittently. Ordinarily the link 36 is disconnected and a continuous motion effected. The shaft 38 is provided at its lower end with a beveled gear 39, that meshes with a second beveled gear 40, and is driven by means of the spur-wheel 41 that is loose on the shaft 43 which is supported in a bracket 42 and bearing-piece $f$. The spur-wheel 41 is driven from the spur-gear 44 that is splined to the section $b^1$ of the clutch $b^2$ which is held closed by means of the spring $b^3$. A foot-lever $b^4$ and bell-crank $b^5$ are provided to throw the clutch out of action. The section $b^1$ is driven from the shaft $b$ by means of the clutch $b^2$.

Figure 1:
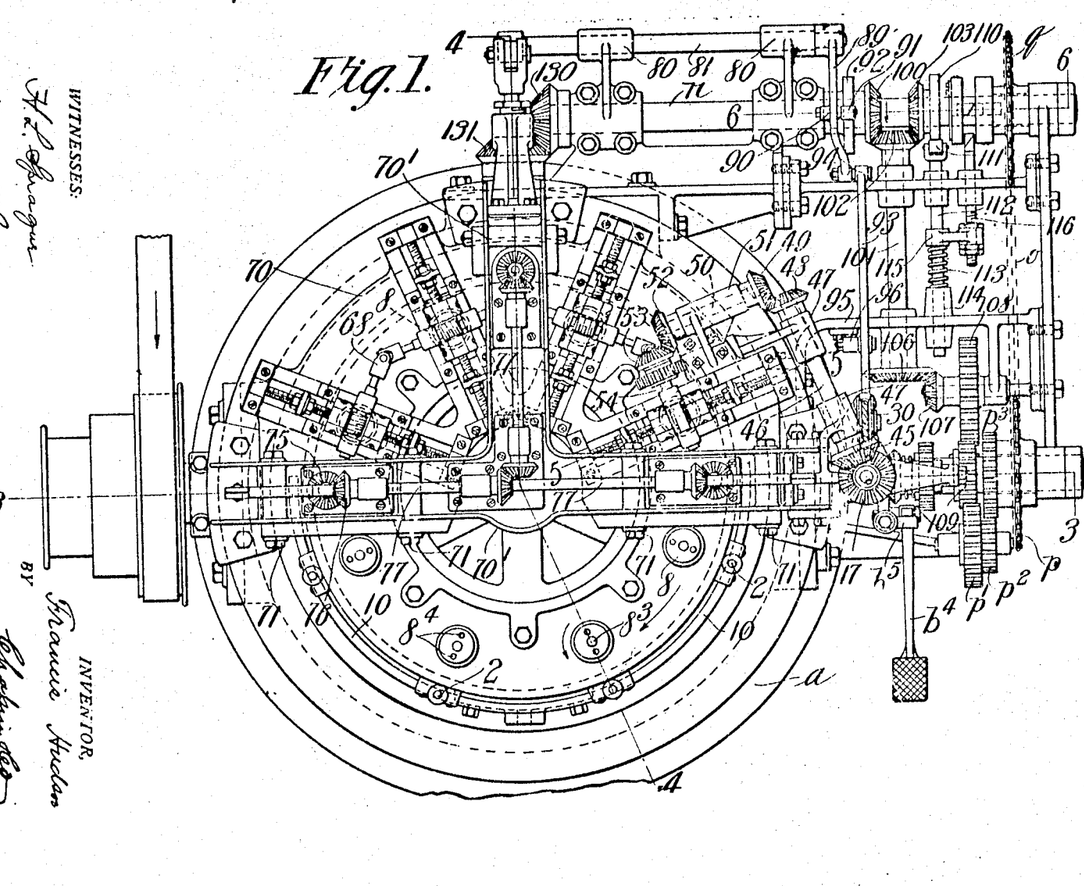
—Figure 1 is a plan view of the assembled machine clearly showing the driving mechanism for operating the tool-carrying turret, and the means for locking the turret at the completion of every half revolution, and the flexible shaft with the universal joints for operating the cutters or chasers.
Figure 5:
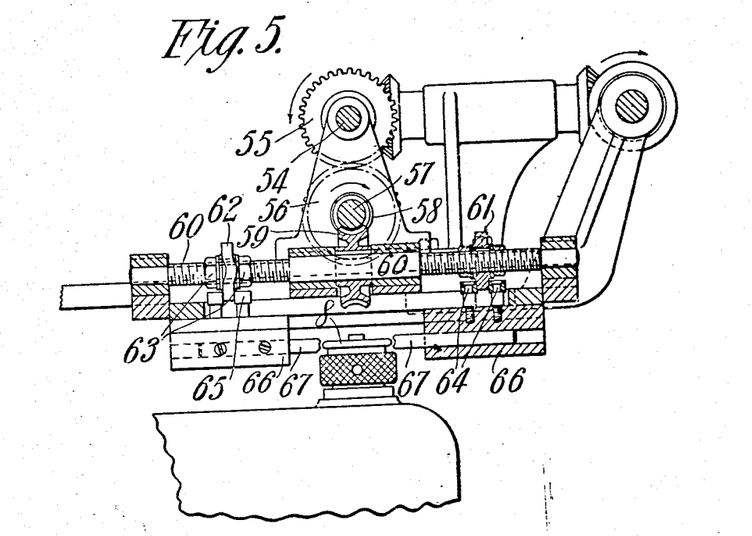
Fig. 5 is a detailed sectional view on line 5—5 of Fig. 1 illustrating the operative means for moving the cutters toward and away from the wheel that is being turned.

45 designates a beveled gear that meshes with the gear 17, which gear is secured to a shaft 46 that is mounted in horizontal bearings 47. On the opposite end of the shaft 46 is a bevel gear 48 that meshes with a beveled gear 49 which is secured to a second shaft 50 mounted in a bearing 51. The bearings for the shafts 46 and 50 are supported in the spider or framework 70¹, as shown in Fig. 1. On the end of the shaft 50 is a beveled gear 52 that meshes with a beveled gear 53 mounted on a shaft 54 (see Figs. 1 and 5). On this shaft 54 is a spur-gear 55 that meshes with a gear 56 on the shaft 57 (see Fig. 5) which is provided with a worm 58 that meshes with a worm-gear 59 mounted on the shaft 60 provided with a right and left-hand thread at its opposite ends, as shown; and secured to this shaft are two disk cams 61 and 62 that are adjustably held thereon by means of the lock-nuts 63. These cams rotate between the pins 64 that are provided with anti-friction rollers 65, and these pins are secured to the tool-carrying slides 66 in which are adjustably secured the chasers or turning tools 67. It will therefore be seen that from this train of mechanism which is driven from the main shaft $b$ the tools 67 are simultaneously advanced toward and withdrawn from the wheels 8 that are to be turned, as clearly illustrated in Fig. 5 and also in plan view in Fig. 1.

From Fig. 1 it will be observed that the various sets of turning tools 67 (four being shown) are operated from the shaft 54 and are connected to each other by means of the universal joints 68, and that, therefore, the plurality of sets of turning tools will all be operated in unison.

It is not deemed necessary to describe in detail the construction of the other three sets of turning tools and the means by which they are operated since they are identical in construction with the one already described.

The nuts 63 are for the purpose of varying the position of the cams 61 and 62 on the shaft 60 so that either smaller or larger wheels may be turned as readily understood.

Referring now to the mechanism for raising and lowering the position of the cutters so as to change their position with reference to the wheels 8 that are to be turned: 70 designates a plate that carries the turning tools or cutters 67 and mechanism by which they are operated, and it is slidably secured to the framework of the machine, being held in its adjusted position by means of the bolts 71 which pass through slots 72 in the plate 70 which is secured by these bolts to the spider or framework 70¹ that is bolted by its three arms to the uprights 12 that are secured to the base $a$. The plate 70 is provided with threaded openings 73, and engaging the same are vertically arranged threaded bolts 74 that are provided on their upper ends with beveled gears 75 which, in turn, mesh with beveled gears 76 that are mounted on the ends of horizontally arranged shafts 77, as clearly shown in Figs. 1 and 4. In order to operate these shafts, it is only necessary (after loosening the bolts 71) to apply a crank or handle to the squared end of the shaft 77, as shown at 78 in Fig. 3, whereby when the shaft is operated the vertically arranged shafts 74 will raise and lower the plate 70, as clearly understood.

The means for actuating the spindle-carrying turret and the means for locking the same at every half revolution will now be described.

Figure 4:
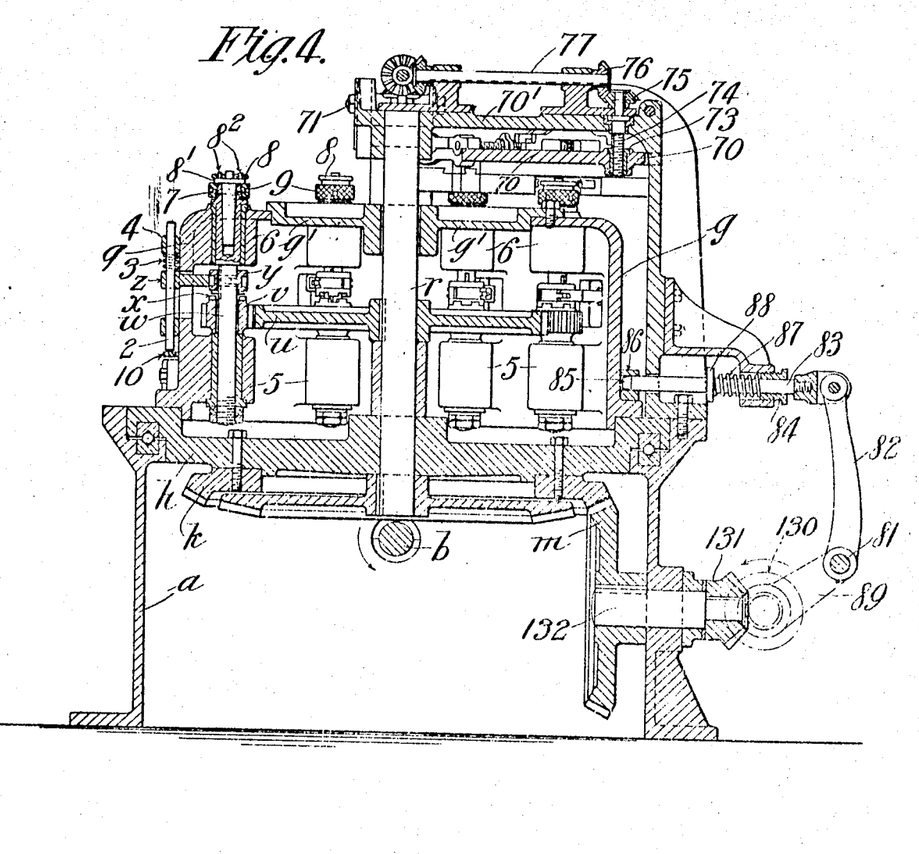
Fig. 4 is a vertical sectional view on the line 4—4, Fig. 1 clearly showing the locking mechanism for holding the spindle-carrying turrets in a stationary position during the turning operation.
Figures 6, 7:
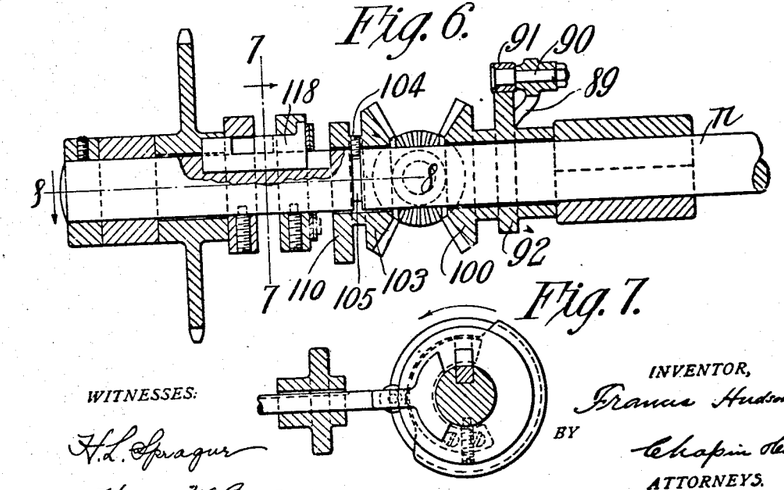
Fig. 6 is a vertical sectional view on the line 6—6 of Fig. 1 illustrating the clutch mechanism for stopping and starting the devices for operating the turret and the turret-locking devices.
Fig. 7 is a vertical sectional view on the line 7—7 of Fig. 6 showing the cam devices for operating the turret-locking and unlocking mechanism and clutch mechanism for connecting and disconnecting the power from the jack-shaft.
Figure 8:
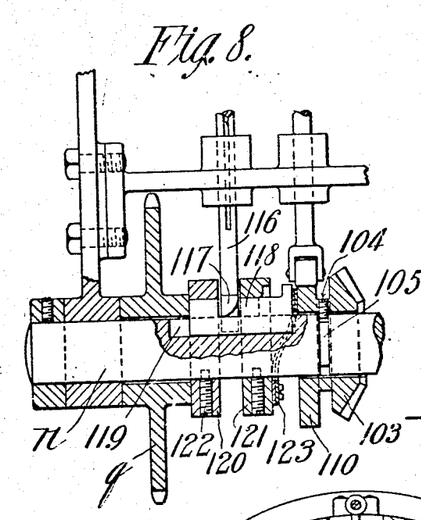
Fig. 8 is a vertical sectional view on the line 8—8 of Fig. 6 illustrating another position of the means for starting and stopping the jack-shaft by means of the sprocket-chain which extends from the drive-shaft.
Figure 9:
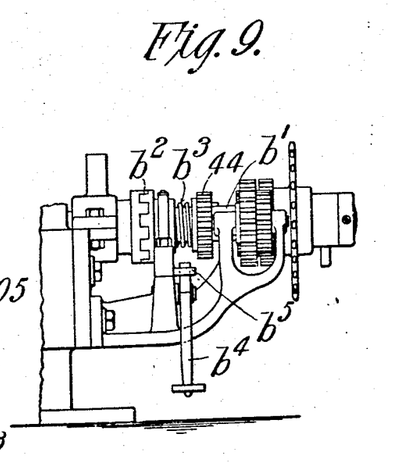
Fig. 9 is an elevational view showing the clutch mechanism for connecting and disconnecting the main shaft from the different trains of mechanism which operate the machine.

Referring to Figs. 1 and 3, bearings 80 are arranged parallel to the shaft $n$ in which is arranged a rocker-shaft 81 and connected to the left-hand end of the same is an arm 82 which is pivotally connected to the turret-locking bolt 83 that passes through a bushing 84, the inner end of which engages an opening 85, (as shown in Fig. 4) in a plate that is secured to the turret, as indicated at 86. A spring 87 is located between a collar 88 and the bushing 84, which collar normally acts to hold the bolt 83 in locking engagement with the plate 86. 89 designates an arm that is secured to the rocker-shaft 81 and pivotally secured at the point 90 is a roller 91 that engages a cam 92 which is carried by the jack-shaft $n$. Pivotally connected to the arm 89 is the rocking lever 35 (see Fig. 2) at the point 94. This lever is mounted pivotally on the frame 95 at the point 96, whereby when the jack-shaft $n$ is rotated the lever 35 will be raised and lowered by means of the cam-roller 92 and will oscillate or rotate about the point 96 which, in turn, will rock the shaft 81 and move the turret-locking bolt 83 inward and outward at the proper time; it of course being in a locked position when the turning operation on the wheels 8 takes place, and in an unlocked position during the half revolution of the turret $q$. The cam 92 is loosely mounted on the shaft $n$ (see Fig. 6) and is driven by means of a beveled gear 100 which is driven in turn from the shaft 101 on the end of which is mounted a beveled gear 102 which meshes with a second beveled gear 103 that is also loosely mounted on the shaft $n$, it being held in place by means of the pin 104 which engages a groove 105. The shaft 101 is provided on its opposite end with a beveled gear 106 which meshes with the second gear 107 that is operated through the spur-gears 108 and 109 from the main driveshaft $b$. The beveled gear 103 is made integral with the cam 110 and engaging the periphery of this cam is a roller 111 that is carried by the rod 112 which is normally pressed or moved toward the cam 110 by means of the coiled spring 113 that is located between the bearings 114 and the collar 115 which operates a rod 116 that has a curved end 117 (see Fig. 8), which is for the purpose of operating the sliding key 118, the key being for the purpose of alternately locking and unlocking the sprocket-wheel $q$ to the jack-shaft $n$. This key is slidable in a groove 119 in the shaft and is shown in Fig. 8 unlocked, and in Fig. 6 in a locked position. The rod 116 slides between the collars 120 and 121 that are permanently secured to the shaft $n$ by means of the set-screws 122. Secured to the collar 121 is a leaf-spring 123 the free end of which engages the key 118 and is for the purpose of moving this key from the position shown in Fig. 8 to that shown in Fig. 6, while the curved end of the rod 116 serves the purpose of forcing the key from the position shown in Fig. 6 to that shown in Fig. 8.

When the sprocket-wheel $q$ is locked to the shaft $n$ the sprocket-chain $o$ will transmit the power from the main shaft to the jack-shaft $n$, and through the beveled gears 130 and 131 (see Fig. 1) to the stub-shaft 132 which, in turn, will drive the beveled gear $m$ and rotate the turret through the gear $k$ at the proper time, that is to say so as to bring a new set of wheels 8 on the turret-spindles into position to be turned after the turret has been unlocked by the bolt 83. The sprocket-gear $p$ is driven from the shaft $b^1$ through the gears $p^1$, $p^2$ and $p^3$.

Extending from the main drive-shaft $b$ to the jack-shaft $n$ is a supporting bar or frame 133 for supporting the outer ends of these shafts in a rigid position.

The wheels 8 to be turned are provided with a central opening $8^3$ and two diametrically placed openings $8^4$ to receive the pins $8^2$ on the elements 7.

The upper end of the turret $q$ is closed by a plate $q^1$, as shown in Fig. 4, for the purpose of preventing the turnings from falling into the machine and also serving as a platform for the wheels 8 to rest on before and after the turning operation.

What I claim, is:—

1. In a turning machine, the combination with a rotatable turret, of substantially parallel spindles journaled thereon and located therein, a shaft rotatable with relation to the turret and located axially therein and substantially parallel to the spindles, a master gear mounted on the shaft within the turret, pinions mounted on the spindles within the turret and meshing with the master gear, mechanism for automatically connecting and disconnecting the pinions and spindles on the rotation of the turret, and means for effecting the intermittent rotation of the said turret.

2. In a turning machine, the combination with a rotatable turret, of spindles journaled thereon and located therein, a shaft rotatable with relation to the turret and located axially therein, a master gear mounted on the shaft within the turret, pinions mounted on the spindles within the turret and meshing with the master gear, mechanism for automatically connecting and disconnecting the pinions and spindles on the rotation of the turret, a main drive shaft, gears connected to the master wheel shaft and driving shaft for continuously operating the latter, a gear fixed to the turret concentric to the gear of the master wheel shaft, and power-transmitting mechanism interposed between the drive shaft and turret gear for effecting an automatic and intermittent rotation of said turret.

3. In a turning machine, the combination with supporting means, of a rotatable turret journaled thereon on an upright axis, a beveled gear fixed to the lower end of the turret, a main drive shaft extending transversely through the supporting means, mechanism connecting the main drive shaft and the beveled gear for effecting an automatic and intermittent rotation of the turret, a vertical shaft journaled axially in the turret, gearing connecting the main drive shaft and the vertical shaft, a master wheel on said shaft, a plurality of work-carrying devices rotatably mounted on the turret, pinions journaled on said devices and in mesh with the master wheel, clutches for connecting and disconnecting the pinions and the devices, and means for effecting the automatic operation of the clutches on the rotation of the turret.

4. In a turning machine, the combination with a rotatable turret, of means for effecting an intermittent rotation of the same, said means including a driven shaft geared to the turret, a driving wheel journaled on the shaft, a key slidable longitudinally of the shaft into and out of engagement with the driving wheel, a wedge device operating transversely of the shaft and engaging the key to move the same, a cam rotatable on the shaft, means for continuously rotating the cam, and a wedge actuating device engaging the cam and operated thereby.

5. In a turning machine, the combination with a base, of a turret rotatable thereon, means for intermittently rotating the turret, a plurality of wheel supports carried by the turret, a plurality of cutters movable into and out of coöperation with the wheel supports, and means for moving the cutters, including an actuating device for each cutter, a shaft comprising angularly disposed sections, each geared to an actuating device, and universal joints connecting the sections.

6. In a turning machine, the combination with a base, of a turret rotatable thereon, means for intermittently rotating the turret, a plurality of spindles journaled on the turret, a plurality of sets of cutters movable into and out of coöperation with the spindles, rotatable cams for moving the cutters of each set, shafts carrying said cams, worm wheels on the shafts, a driving shaft comprising angularly disposed sections, each having a worm meshing with one of said worm wheels, and universal joints connecting the sections.

7. In a turning machine, the combination with a base, of a rotatable turret thereon, spindles journaled on the turret, a vertically movable support, adjustable cutters carried by the support, means for adjusting the cutters also mounted on the support, and means for vertically moving the support and holding it in different positions.

8. In a turning machine, the combination with a rotatable turret, of work supporting means mounted thereon, a movable cutter coöperating with the work supporting means, a shaft disposed longitudinally of said cutter, a cam mounted on the shaft and operating on the cutter to move it, and means for adjusting the cam longitudinally along the shaft.

9. In a turning machine, the combination with a rotatable turret and work-supporting means mounted thereon, of a pair of oppositely movable cutters coöperating with the work-supporting means, a threaded shaft disposed longitudinally of the cutters, cams rotatable with the shaft and engaging the cutters to move them in opposite directions, said cams being slidable longitudinally along the shaft, nuts threaded on the shaft for holding the cams in different adjusted positions, and means for rotating the shaft to move the cutters.

10. In a turning machine, the combination with an intermittently rotated turret, of a driven shaft geared thereto, a driving member journaled on the shaft, means for connecting and disconnecting the driving member and driven shaft, including a rotatable device, a lock for holding the turret against movement, actuating means for the lock including a rotatable device, and a common driving member geared to both rotatable devices for operating the same.

11. In a turning machine, the combination with an intermittently rotated turret, of a driven shaft geared thereto, a rock shaft located alongside the driven shaft, a locking device for the turret operated by the rock shaft, a driving wheel journaled on the shaft, a key for connecting and disconnecting the wheel and shaft, a pair of cams journaled on the shaft, an arm carried by the rock shaft and engaging one of the cams, operating means for the key engaging the other cam, and a driving device geared to both cams.

12. The combination with a turret member, a jack-shaft, connecting means for operating the turret from said shaft, a bevel gear loosely mounted on the shaft and having a cam or eccentric member integral therewith, a sprocket drive wheel loose on the shaft, and means operable from the cam for connecting and disconnecting the sprocket wheel to the jack-shaft, whereby the turret will be intermittently operated.

13. The combination with a spindle-carrying turret, of a jack-shaft for operating the same, a pair of bevel gears loosely mounted thereon, each gear having an eccentric integral therewith, means operated by one eccentric to lock and unlock the turret, and means operated by the other eccentric to connect and disconnect the source of power for operating the turret.

FRANCIS HUDSON.

Witnesses:
WILLIAM HUDSON,
CHARLES J. BUSS.